United States Patent [19]

McMahon, Jr. et al.

[11] 4,287,244

[45] Sep. 1, 1981

[54] METHOD FOR REVERSE PRINTING ON COATED TUBE PAPERS AND TUBES PRODUCED FROM THE PAPER

[75] Inventors: Edward H. McMahon, Jr.; J. B. Abston, both of Hartsville, S.C.

[73] Assignee: Sonoco Products Company, Hartsville, S.C.

[21] Appl. No.: 99,702

[22] Filed: Dec. 3, 1979

[51] Int. Cl.$^3$ .......................... B31C 13/00; B32B 1/06; B32B 27/10

[52] U.S. Cl. .......................................... 428/35; 8/919; 156/277; 428/203; 493/270; 493/294; 493/297

[58] Field of Search ...................... 428/203, 35; 8/919; 156/277; 493/270, 294, 297, 320

[56] References Cited

U.S. PATENT DOCUMENTS

| | | | |
|---|---|---|---|
| 1,384,290 | 7/1921 | Winchenbaugh et al. | 8/919 |
| 1,454,363 | 5/1923 | Winchenbaugh et al. | 8/919 |
| 4,006,048 | 2/1977 | Cannady et al. | 428/203 |

FOREIGN PATENT DOCUMENTS

| | | | |
|---|---|---|---|
| 408242 | 4/1934 | United Kingdom | 493/297 |

*Primary Examiner*—James C. Cannon

*Attorney, Agent, or Firm*—Dennison, Meserole, Pollack & Scheiner

[57] ABSTRACT

A method for providing identificational coloration on a paper ply of a yarn tube or similar article, the invention comprises reverse printing of a dye onto a pervious paper which is coated on the outer surface with a transparent polymer coating, the coating being impervious to the dye. According to the invention, the dye penetrates through the paper but not through the polymer coating, the informational coloration and/or pattern of the dye being clearly visible through the polymer coating to allow ready identification of the yarn or other material carried on the tube.

11 Claims, 3 Drawing Figures

METHOD FOR REVERSE PRINTING ON COATED TUBE PAPERS AND TUBES PRODUCED FROM THE PAPER

BACKGROUND OF THE INVENTION

1. Field of the Invention

The invention relates generally to yarn tubes and similar articles, particularly such articles which are formed of multiple plies of paper or thin paperboard. The invention is further concerned with improvements in tube identification which are brought about by reverse printing of dyes in varying colors and/or patterns on a ply of the tube.

2. Description of the Prior Art

Yarn tubes formed of multiple plies of spirally wound strips of paper or thin paperboard have long been used as a base member onto which yarn or similar material is wound. Such yarn tubes are formed with a spirally wound outer ply which provides a generally smooth outer surface having surface characteristics which are compatible with the function of the tube, that is, to receive and discharge yarn in the usual applications. The outer surface of a yarn tube must be smooth and free of "fuzz" in order that yarn can readily be transferred to and from the tube. In order to provide desirable surface characteristics, polymer plastic coatings can be formed on the outer paper ply. However, standard practices in the industry now virtually require that yarn tubes be printed with color and pattern markings which identify the material wound on the tube. Tube outer ply papers which are coated on the outer surfaces thereof with polymer plastic coatings cannot economically be printed or marked permanently as the tube is being manufactured.

In order that the advantages of a polymer surface coating can be combined with a desired color or pattern in a manufactured tube, it has become standard practice in the art to use preprinted or predyed paper manufactured by first printing the dye onto a substrate paper and then coating the printed paper with a polymer coating. This practice results in a number of disadvantages, particularly the necessity for obtaining and maintaining large inventories of different colored and patterned coated papers. Coatings on innermost plies are also often necessary in order to protect the tube from wetting and/or to facilitate mounting of the tube on a mandrel. The present invention provides a method and article whereby identification codes or indicia can be applied to a paper ply of a yarn tube as the yarn tube is being manufactured, the identification coloration or pattern thus becoming integral with the tube itself at the time of manufacture and without the need for maintaining large inventories of preprinted papers which are either precoated or coated in-line with a polymer plastic. The article of manufacture produced according to the present method is a tube which is less expensively manufactured but which provides instant information relative to the source, destination and nature of the product which is carried by the tube.

SUMMARY OF THE INVENTION

The yarn tube of the present invention is formed with a paper ply which is pervious to the printing ink or dyes used according to the method of the invention. While reference is made herein to use of the invention as the "outer" ply, it is to be understood that the "inner" ply of a yarn tube could also be formed according to the invention. Accordingly, reference herein to "outer" ply is understood to encompass also the innermost ply of a tube, which inner ply is also useful for identification. In particular, the paper ply can be formed of "kraft" paper or similar material which is substantially porous and therefore allows passage of the liquid dye through the paper. The outer surface of the paper is coated with a polymer plastic coating which acts as a barrier to the further migration of the dye through the coated outer ply. The invention particularly contemplates the use of an opaque substrate material for the paper portion of the coated outer ply with a transparent or translucent polymer coating being formed on the outer surface of the paper. The present method thus allows identification of tubes having polymer-coated outer plies by reverse printing of dyes on the uncoated side of the outer ply, this printing being preferably accomplished "in-line" while the tube is being manufactured. In this manner, inexpensive opaque papers can be utilized as the outer ply, desired outer surface characteristics being realized by virtue of the application of the polymer coating to the outer side of the inexpensive and relatively low grade opaque papers. Although low-grade opaque papers are used as the outer ply according to the invention, the ability to identify the tubular articles by coloration and/or pattern is not sacrificed due to the provision of a paper substrate which is pervious to the dye or ink printed on the reverse or uncoated side of the paper substrate. The migration of the printed dye through the paper substrate and up to the polymer plastic barrier allows the coloration and/or pattern to be visible through the transparent or translucent plastic polymer coating.

Accordingly, it is an object of the present invention to provide a yarn tube or similar article formed of multiple plies of paper or thin paperboard and having an opaque paper outer ply coated on the exterior surface thereof with a transparent polymer plastic and which is reverse printed on the uncoated side of the opaque paper substrate with a dye or ink which migrates through the paper substrate to become visible through the transparent polymer coating, thereby to provide desirable surface characteristics and visible coded informational indicia on the exterior of the tube.

It is another object of the present invention to provide a method for manufacturing yarn tubes or similar articles by in-line reverse printing of a dye on the uncoated side of a polymer-coated outer paper ply, the dye migrating through the paper substrate to be visible through the polymer coating, the polymer coating being transparent or translucent and further being impervious to passage of the dye therethrough.

It is a further object of the invention to provide a yarn tube or similar article having desirable surface characteristics such as are provided by a polymer plastic coating and which also is inexpensively produced from opaque, relatively low-grade paper used as an outer ply for the tube, the exterior surface of the paper outer ply being coated with the plastic polymer and the inner surface of the ply being printed with a dye which passes through the paper to become visible through the plastic coating.

Further objects and advantages of the present invention will become more readily apparent in light of the following detailed description of the preferred embodiments of the invention.

DESCRIPTION OF THE PREFERRED EMBODIMENTS

Figure 1:
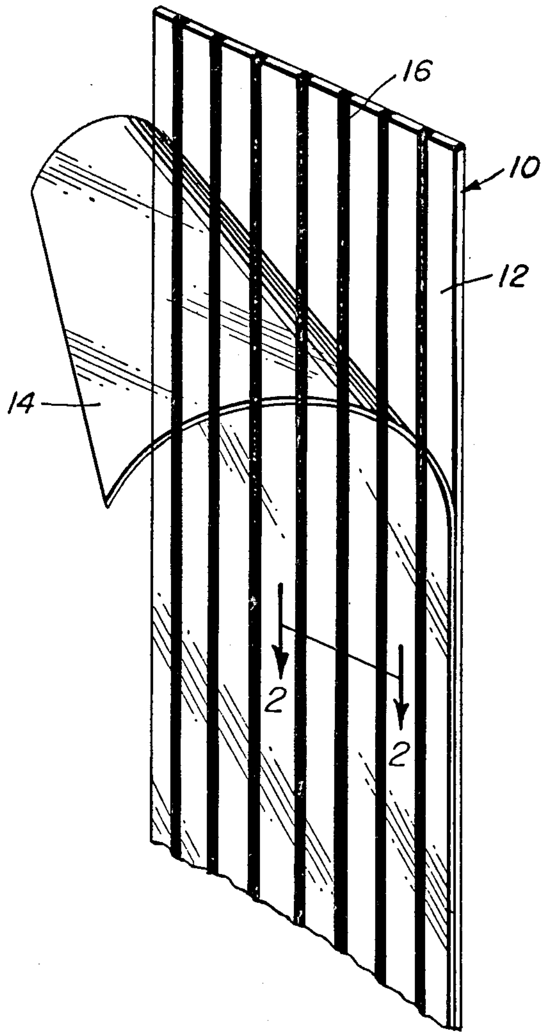
FIG. 1 is a perspective view of a strip of polymer-coated porous outer ply paper to which ink has been applied on the uncoated side thereof, a portion of the polymer coating being shown cut-away from the paper.
Figure 3:
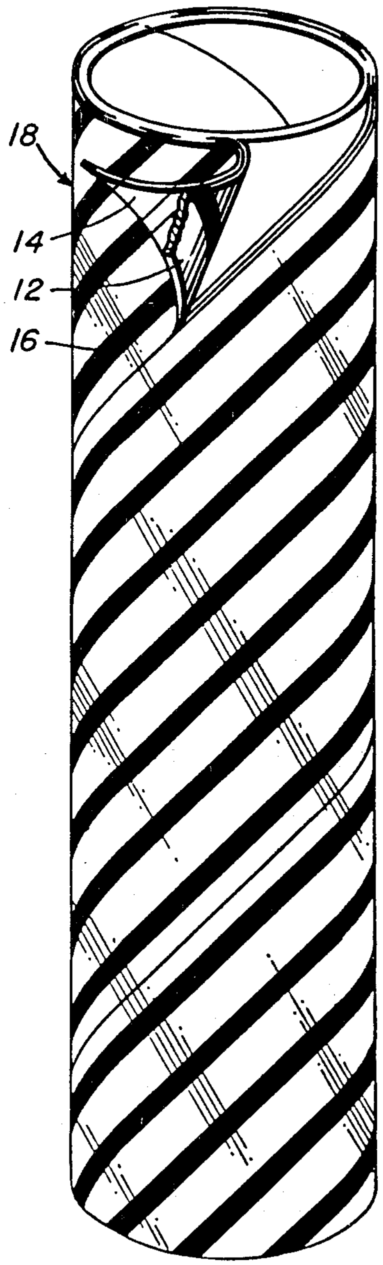
FIG. 3 is a perspective view of a tube having the outer ply thereof formed of the polymer-coated and reverse printed ply being partially unwound and partially cut-away for purposes of illustration.

Referring now to the drawings and particularly to FIGS. 1 and 3, a strip of outer ply material formed according to the present invention is seen generally at 10 to comprise a paper substrate 12 having a polymer coating 14 formed over one surface thereof. The paper substrate 12 can be formed of any porous paper-like material which can be penetrated by dyes. A preferred material for forming the paper substrate 12 is plain "kraft" paper. Non-woven materials, fabrics, and similar porous papers and similar materials can also be used. These inexpensive papers are typically seen to be opaque as well as relatively porous and pervious to the inks and/or dyes used according to the present invention.

The polymer coating 14 is taken to be any polymer or co-polymer which will provide a desired smooth surface on the outer surface of the strip 10 and which will also serve as a barrier to the flow of dye through the strip 10. In this regard, the invention contemplates the application of ink and/or dye to the uncoated side of the paper substrate 12, the dye penetrating through the paper substrate 12 to the interface between the substrate 12 and the polymer coating 14. The polymer coating 14 acts as a barrier at this interface to prevent penetration of the dye completely through the strip 10. The polymer coating 14 is also intended to be transparent or translucent such that the dye which has penetrated through the paper substrate 12 can be viewed through said coating 14. It is not desirable, however, that the dye penetrate through the polymer coating 14 since the dye could then contaminate yarn or other material wound upon an article formed from the strip 10. While many polymeric materials are available which have the necessary characteristics, that is, impermeability to dye penetration, transparency, and ability to provide a smooth outer surface, it also is to be understood that two or more layers of polymeric material could be used to form the polymer coating 14. In such a circumstance, an inner layer of polymeric material would be used to block the flow of dye through the strip 10 while an outer polymeric layer would be used to provide the necessary surface characteristics for the strip 10. The several layers of such a polymer coating would, of course, be transparent or translucent. Multiple layers of polymeric material would be used in a situation where a polymer producing desirable surface characteristics would not also serve as a barrier to the penetration of dye through the strip 10.

Particular materials useful for forming the polymer coating 14 are polypropylene, polyvinyl chloride, polyvinyl acetate, polyvinylidene chloride, esters of polyacrylic acid, polystyrol, polyethylene, and the like. The polymer coating 14 could also be formed of co-polymers such as vinylidene chloride such as are prepared by the co-polymerization of vinylidene chloride with co-polymerizable ethylenically unsaturated monomers such as acrylonitrile, methacrylonitrile, alkyl esters of acrylic and methacrylic acid, phenyl methacrylate, cyclohexyl methacrylate, methyl vinyl ketone, vinyl chloride, vinyl acetate, and the like. It should be noted that the polymer coating 14 can be formed on the outer surface of the paper substrate 12 in any desirable manner, such as by coating of the liquid precursor material which then polymerizes in situ. Alternatively, a polymer film can be adhesively attached to the outer surface of the paper substrate 12.

Figure 2:
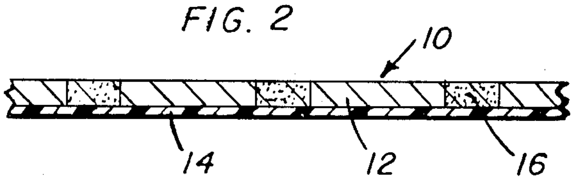
FIG. 2 is a sectional view taken along line 2—2 of FIG. 1.

As seen in the drawings, stripes 16 are printed on the uncoated side of the paper substrate 12, the stripes 16 being formed of dyes and/or inks which have a capability of penetrating through the relatively porous paper substrate 12. As is particularly seen in FIG. 2, the dye is seen to penetrate throughout the paper substrate 12 to form the stripes 16, the dye penetrating through said substrate 12 to the outer surface of said substrate 12 being visible through the polymer coating 14 to provide identification indicia to an article which is formed from the strip 10. The dye is preferably applied to the uncoated side of the paper substrate 12 during manufacture of an article of which the strip 10 forms the outer ply. Such an article is shown as tube 18 in FIG. 3. As is seen in FIG. 3, the tube 18 is formed of multi-ply stock material which is spirally wound in a conventional manner to form the body of the tube 18. The strip 10 is wound about the multi-ply tube as the last ply thereof after dye has been applied to the uncoated surface of the paper substrate 12 as aforesaid. Accordingly, any desired color or pattern can be applied to the strip 10 immediately before forming of the strip 10 as the outer ply of the tube 18. Therefore, any desired pattern can be formed on the strip 10 immediately before manufacture of the tube 18, thereby eliminating the necessity for obtaining and maintaining large inventories of preprinted outer ply papers. The informative indicia represented by the stripe 16 are seen to be substantially coextensive with the entire visible surface of the tube 18. As an alternative, the indicia can be provided about selected portions of the tube and can be formed in any number of patterns and colors. In all instances, it is to be understood that the indicia is highly visible on the tube and is fully protected by virtue of the provision of the polymer coating 14. The presence of the indicia is seen to have no effect upon the desirable smooth outer surface of the strip 10.

Dye which is reverse printed on the uncoated side of the paper substrate 12 preferably comprises alcohol-soluble dyes, such as the "Luxol" dyes produced by the Dupont Corporation. According to Volume 5 of the third edition of the Colour Index, these dyes are solvent dyes and are identified in the following listing:

| | |
|---|---|
| C.I. Solvent Green 11 | C.I. Solvent Brown 17 |
| C.I. Solvent Black 24 | C.I. Solvent Orange 25 |
| C.I. Solvent Black 17 | C.I. Solvent Orange 24 |
| C.I. Solvent Blue 37 | C.I. Solvent Red 33 |
| C.I. Solvent Blue 34 | C.I. Solvent Red 34 |
| C.I. Solvent Blue 38 | C.I. Solvent Red 69 |
| C.I. Solvent Brown 19 | C.I. Solvent Yellow 47 |
| C.I. Solvent Brown 20 | |

It is to be understood that these dyes are only indicated as being particularly useful in a practice of the present invention due to the desirable color characteristics of the dyes and due to the fact that these dyes will penetrate the usual paper materials used as the paper substrate 12. It is to be understood that many other dyes and inks will also provide the necessary color and penetration characteristics required for a successful practice of the invention, including variable water-soluble dyes and inks.

The dyestuff used in the practice of the invention is typically dissolved in a suitable solvent, such as an alcohol solvent and is conveniently used in a 2.5 percent solution thereof. This solution is applied to the uncoated side of the paper substrate 12 such as through the use of a felt wipe or other applicator during the winding operation which occurs in the in-line production of articles such as the tube 18. Of course, the step of applying the dye can occur off-line without departing from the scope of the invention. The dye migrates or penetrates through the paper substrate 12 to the barrier formed by the polymer coating 14. During manufacture of the tubes 18, the strip 10 also has adhesive applied thereto immediately prior to wrapping of the strip 10 about the exterior of the tube 18 to form the outermost ply thereof.

It is seen from the foregoing that color and pattern indicia can be provided on a yarn tube or similar article by an in-line manufacturing process. In particular, inexpensive paper substrate materials, which materials are typically opaque, can be used with an outer polymer coating to provide desired surface characteristics. It is to be understood that the porous paper-like substrates referred to herein are taken to include woven and non-woven materials, fabrics, and similar sheet materials having those characteristics necessary to a practice of the invention as described above. The polymer coating is intended to be transparent or translucent such that dye applied to the uncoated side of the paper substrate 12 is visible from externally of the tube 18. Therefore, highly visible informational indicia can be provided on a yarn tube or the like by "in-line" processing techniques by reverse printing of a dye onto the uncoated side of a paper substrate which allows penetration of the dye through the body of the substrate itself.

Although the present invention has been explicitly described above in the form of several preferred embodiments, it is to be understood that the scope of the invention is to be defined by the recitations of the appended claims.

What is claimed is:

1. In a method for making a yarn tube or similar article comprising a tube body and an outer ply having indicia visible through an outer polymer lamina, the improvement comprising the steps of:

providing an outer ply comprising a lamina of a relatively porous paper-like substrate with the polymer lamina on one surface;

providing the outer ply with indicia by printing a dye onto at least a portion of the surface of the substrate opposite the polymer lamina under conditions wherein the dye is caused to be visible at an interface between the substrate and the polymer lamina; and forming the printed outer ply onto the tube body with the polymer lamina comprising an outer surface of the tube.

2. The method of claim 1, wherein the dye is printed onto the substrate during manufacture of the tube.

3. The method of claim 1 wherein the substrate is formed of opaque material.

4. The method of claim 1 wherein the substrate is formed of kraft paper.

5. The method of claim 1 wherein the dye is applied to the substrate as a 2.5 percent solution of solvent and dyestuff selected from the group consisting of C.I. Solvent Green 11, C.I Solvent Black 17 and 24, C.I. Solvent Blue 37, C.I. Solvent Blue 34, C.I. Solvent Blue 38, C.I. Solvent Brown 17, C.I. Solvent Brown 19, C.I. Solvent Brown 20, C.I. Solvent Orange 24 and 25, C.I. Solvent Red 33, C.I. Solvent Red 34, C.I. Solvent Red 69, and C.I. Solvent Yellow 47.

6. The method of claim 1 wherein the polymer coating is formed of a material selected from the group consisting of polypropylene, polyvinyl chloride, polyvinyl acetate, polyvinylidene chloride, esters of polyacrylic acid, polystyrol, and polyethylene.

7. The method of claim 1 wherein the dye is visible by virtue of penetration generally to the interface between the substrate and the polymer laminae.

8. The yarn tube produced by the method of claim 1.

9. The yarn tube produced by the method of claim 4.

10. The yarn tube produced by the method of claim 5.

11. The yarn tube produced by the method of claim 6.

* * * * *